United States Patent
Kadowaki et al.

(10) Patent No.: US 10,679,182 B2
(45) Date of Patent: Jun. 9, 2020

(54) SYSTEM FOR MEETING FACILITATION

(71) Applicant: International Business Machines Corporation, Armonk, NY (US)

(72) Inventors: Isao Kadowaki, Yokohama (JP); Xueting Lin, Tokyo (JP); Shigetoshi Nogami, Yokohama (JP); Munetaka Ohtani, Fujisawa (JP); Terue Watanabe, Tokyo (JP); Fumiyoshi Yamada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 15/598,033

(22) Filed: May 17, 2017

(65) Prior Publication Data

US 2018/0336519 A1    Nov. 22, 2018

(51) Int. Cl.
*G06F 16/00*    (2019.01)
*G06Q 10/10*    (2012.01)
(Continued)

(52) U.S. Cl.
CPC ........... *G06Q 10/10* (2013.01); *G06F 16/345* (2019.01); *G06F 16/35* (2019.01); *G06F 40/35* (2020.01);
(Continued)

(58) Field of Classification Search
CPC ...... G06F 3/04815; G06F 40/35; G06F 16/35; G06F 16/345; G06Q 10/10
(Continued)

(56) References Cited

U.S. PATENT DOCUMENTS 7,672,841 B2 * 3/2010 Bennett .................. G06F 40/42
704/215
8,214,242 B2    7/2012 Agapi et al.
(Continued)

FOREIGN PATENT DOCUMENTS

JP    2011-100355    5/2011
JP    2014-174465    9/2014
JP    2015-156099    8/2015

OTHER PUBLICATIONS

DOT language(graph description language), https://ja.wikipedia.org/wiki/DOT%E8%A8%80%E8%AA%9E, pp. 1-5, as downloaded May 17, 2017.
(Continued)

*Primary Examiner* — Laurie A Ries
(74) *Attorney, Agent, or Firm* — Reza Sarbakhsh

(57) ABSTRACT

A method, system and computer program product for facilitating a meeting is implemented in a server computer and provides a graphical user interface to one or more client devices. The server displays a mind map of a center topic on the clients. The server collects statements of participants, and extracts words and phrases therefrom, to identify topics that are currently being discussed. The server determines whether a transition has occurred between the topics, and then calculates a correlation between the topics that are currently being discussed and the center topic. The server determines a location of the topics that are currently being discussed on the mind map, based on the calculated correlation, and displays an updated mind map on the clients. The server generates a warning on the clients when the server determines that the meeting proceedings are being retarded, based on the calculated correlation.

18 Claims, 15 Drawing Sheets

(51) Int. Cl.
  *G08B 21/18* (2006.01)
  *G06F 16/35* (2019.01)
  *G06F 16/34* (2019.01)
  *G10L 15/18* (2013.01)
  *G10L 15/26* (2006.01)
  *G06F 40/35* (2020.01)

(52) U.S. Cl.
  CPC ........ *G08B 21/182* (2013.01); *G10L 15/1822* (2013.01); *G10L 15/26* (2013.01)

(58) Field of Classification Search
  USPC ......................................................... 715/254
  See application file for complete search history.

(56) References Cited

U.S. PATENT DOCUMENTS

| | | | | |
|---|---|---|---|---|
| 2009/0006608 | A1* | 1/2009 | Gupta | G06Q 10/10 709/224 |
| 2009/0172035 | A1* | 7/2009 | Lessing | G06F 16/284 |
| 2010/0064010 | A1 | 3/2010 | Klkov et al. | |
| 2012/0002798 | A1 | 1/2012 | Chen et al. | |
| 2012/0290958 | A1* | 11/2012 | Letzelter | G06F 3/04842 715/764 |
| 2012/0323575 | A1* | 12/2012 | Gibbon | G11B 27/28 704/246 |
| 2013/0132138 | A1* | 5/2013 | Doganata | G06Q 10/06 705/7.11 |
| 2014/0200944 | A1* | 7/2014 | Henriksen | G06Q 10/1095 705/7.19 |
| 2014/0201126 | A1* | 7/2014 | Zadeh | A61B 5/4803 706/52 |
| 2014/0236953 | A1* | 8/2014 | Rapaport | G06Q 10/10 707/740 |
| 2015/0154960 | A1* | 6/2015 | Ai | G10L 17/00 704/246 |
| 2015/0235654 | A1 | 8/2015 | Gibbon et al. | |
| 2017/0060917 | A1* | 3/2017 | Marsh | G06F 16/7844 |
| 2018/0025303 | A1* | 1/2018 | Janz | G06Q 10/0639 705/2 |
| 2018/0159744 | A1* | 6/2018 | Tee | H04L 41/147 |
| 2018/0293221 | A1* | 10/2018 | Finkelstein | G10L 17/10 |
| 2018/0329880 | A1* | 11/2018 | Galitsky | G06F 16/322 |

OTHER PUBLICATIONS

Kushner, M.J., et al., "From Word Embeddings to Document Distances", Proceedings of the 32nd International Conference on Machine Learning, Lille, France, 2015, pp. 1-10, JMLR: W&CP vol. 37.

Trapani, G., "A Beginner's Guide to Mind Mapping Meetings", Aug. 13, 2007, http://hifehacker.com/288763/a-beginners-guide-to-mind-mapping-meetings, pp. 1-3, as downloaded May 17, 2017.

* cited by examiner

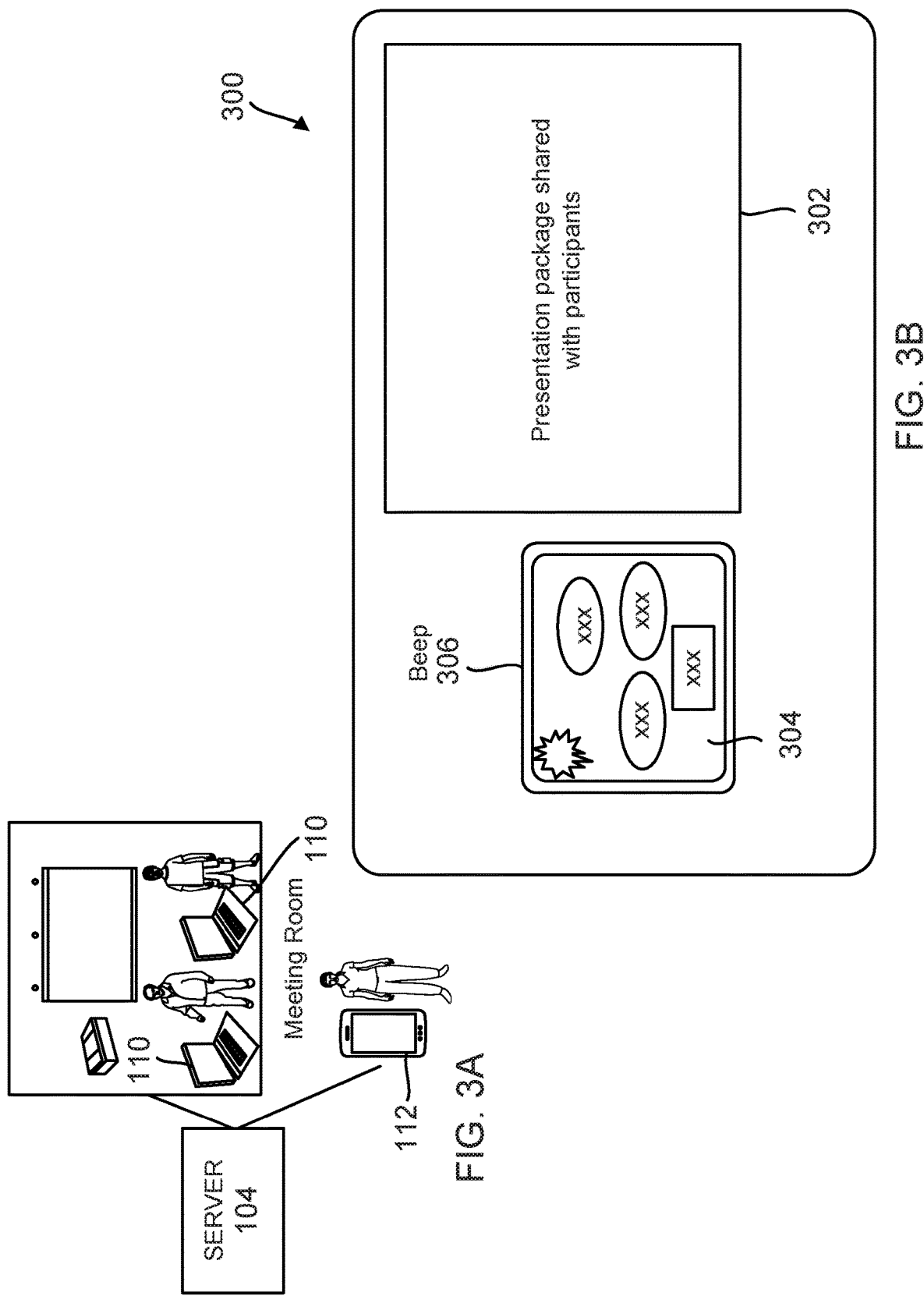

Statements in the Meeting:

A: It's <u>strawberry shortcake</u>, isn't it?

B: Don't you think that <u>sourness of strawberry is important</u>?

C: Instead I would like to <u>pay attention to sweetness of the cake.</u>

SYSTEM FOR MEETING FACILITATION

BACKGROUND

The present invention relates generally to a system for meeting facilitation. There are a number of issues related to meeting facilitation.

Generally, acceleration of the meeting process is a prerequisite, although this may not be the case with meetings for deeper discussions and seeking common understandings. Nonetheless, the goal for most meetings is to decide on something, i.e., make a decision, for most participants and, in particular, the persons in charge. In such a meeting, it is necessary to avoid any irrelevant discussion.

There exist some technologies relating to meeting facilitation. However, none of these technologies have any functions that explicitly attempt avoidance of irrelevant discussions.

SUMMARY

The invention provided herein has a number of embodiments useful, for example, in implementing a system and method for facilitating a meeting in a server computer and providing a graphical user interface to one or more client devices connected thereto, wherein:

the server computer displays a mind map of a center topic on the client devices, the center topic serving as a theme of the meeting, and the center topic being registered with the server computer in advance of the meeting;

the server computer collects statements of participants during the meeting, the collected statements being subjected to analysis by the server computer to extract words and phrases therefrom in a time-series manner, and the extracted words and phrases being defined as one or more topics that are currently being discussed in the meeting;

the server computer analyzes the extracted words and phrases to determine whether a transition has occurred between the topics, and then calculates a correlation between the topics that are currently being discussed and the center topic;

the server computer determines a location of the topics that are currently being discussed on the mind map, based on the calculated correlation, and displays an updated mind map on the client devices; and the server computer generates a warning on the client devices when the server computer determines that the meeting proceedings are being retarded, based on the calculated correlation.

In addition, the system and method include, but are not limited to, the following:

the server computer generates the warning on the client devices when the server computer determines that the calculated correlation exceeds a threshold;

the server computer generates the warning on the client devices when the server computer determines that the topics that are currently being discussed are repeated or recursive topics;

the server computer displays the transition on the mind map as an arrow representing an order of occurrence of the topics that are currently being discussed;

the server computer designates the topics that are currently being discussed as the center topic; and/or the server computer records a duration of each of the collected statements made by the participants, as well as an identity of the participant who made the collected statements.

BRIEF DESCRIPTION OF THE DRAWINGS

Referring now to the drawings in which like reference numbers represent corresponding parts throughout:

FIG. 3A shows a typical environment for using the system for facilitating meetings.

FIG. 3B shows a graphical user interface presented by the server on each of the participating clients.

FIGS. 4A, 4B and 4C illustrate the voice analysis performed by the server, wherein words and phrases are extracted in a time-series manner.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The present invention is a computer-implemented system for meeting facilitation that more explicitly achieves avoidance of irrelevant discussions through the following computer-implemented functions:

A function for, in the process of the meeting, specifying a center topic for discussion among the participants of the meeting, and visually representing the center topic on a mind map displayed to participating devices.

A function for, in the process of the meeting, defining topics from words and phrases extracted from statements made by participants during the meeting.

A function for, in the process of the meeting, calculating a correlation between the topics and the center topic, and visually representing the correlation on the mind map.

A function for, in the process of the meeting, generating a warning in response to occurrence of an event regarded as indicating that the meeting proceedings are retarded.

A function for, in the process of the meeting, issuing a warning in the process of the meeting if a topic having a weak correlation with the center topic, which is an agenda that has been specified in advance, is discussed for a predetermined period of time or longer.

A function for, in the process of the meeting, tracking the transition relationships of topics and generating a warning in response to repeated or recursive occurrence of multiple existing topics or in response to formation of a loop of these topics.

A function for, in the process of the meeting, computing and explicitly presenting a new topic that should be the center topic of the discussions in the meeting from among the topics that have been discussed during the meeting.

Utilization of these functions provided by the present invention makes it possible to facilitate smoother proceedings of the meeting.

Hardware and Software Environment

Figure 1:
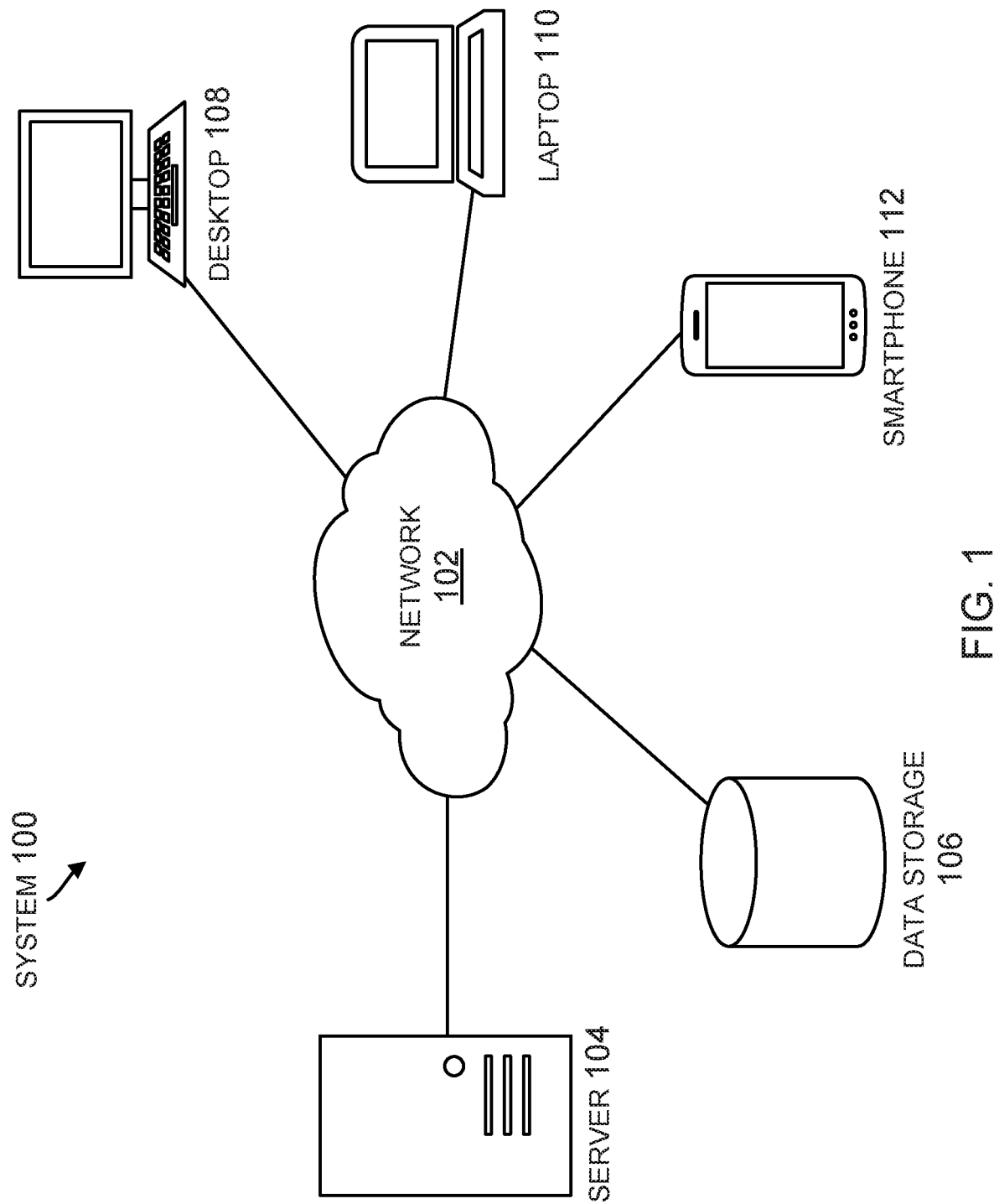
FIG. 1 is a pictorial representation of a system for facilitating meetings is presented in which the invention may be implemented.

With reference now to FIG. 1, a pictorial representation of a system 100 for facilitating meetings is presented in which the invention may be implemented. The system 100 not only facilitates meetings, it helps in avoiding irrelevant discussions during the meeting.

The system 100 includes a network 102, which is the medium used to provide communications links between various devices and computers connected together within the system 100. In the depicted example, the network 102 may be a local area network (LAN), wide area network (WAN), the Internet, or another network.

In the depicted example, a server computer 104 is connected to the network 102 along with a data storage unit 106. In addition, client devices 108, 110, 112 are connected to the server computer 104 via the network 102. These client devices 108, 110, 112 may be, for example, desktop computers 108, laptop or notebook computers 110, smartphones 112 and other devices.

In the depicted example, the server computer 104 provides data and programs to client devices 108, 110, 112. Specifically, the server computer 104 implements the functionality of the system for facilitating meetings 100 and for providing a suitable graphical user interface accessible by users of the participating client devices 108, 110, 112. These aspects of the system 100 are described in more detail below.

System Configuration

Figure 2:
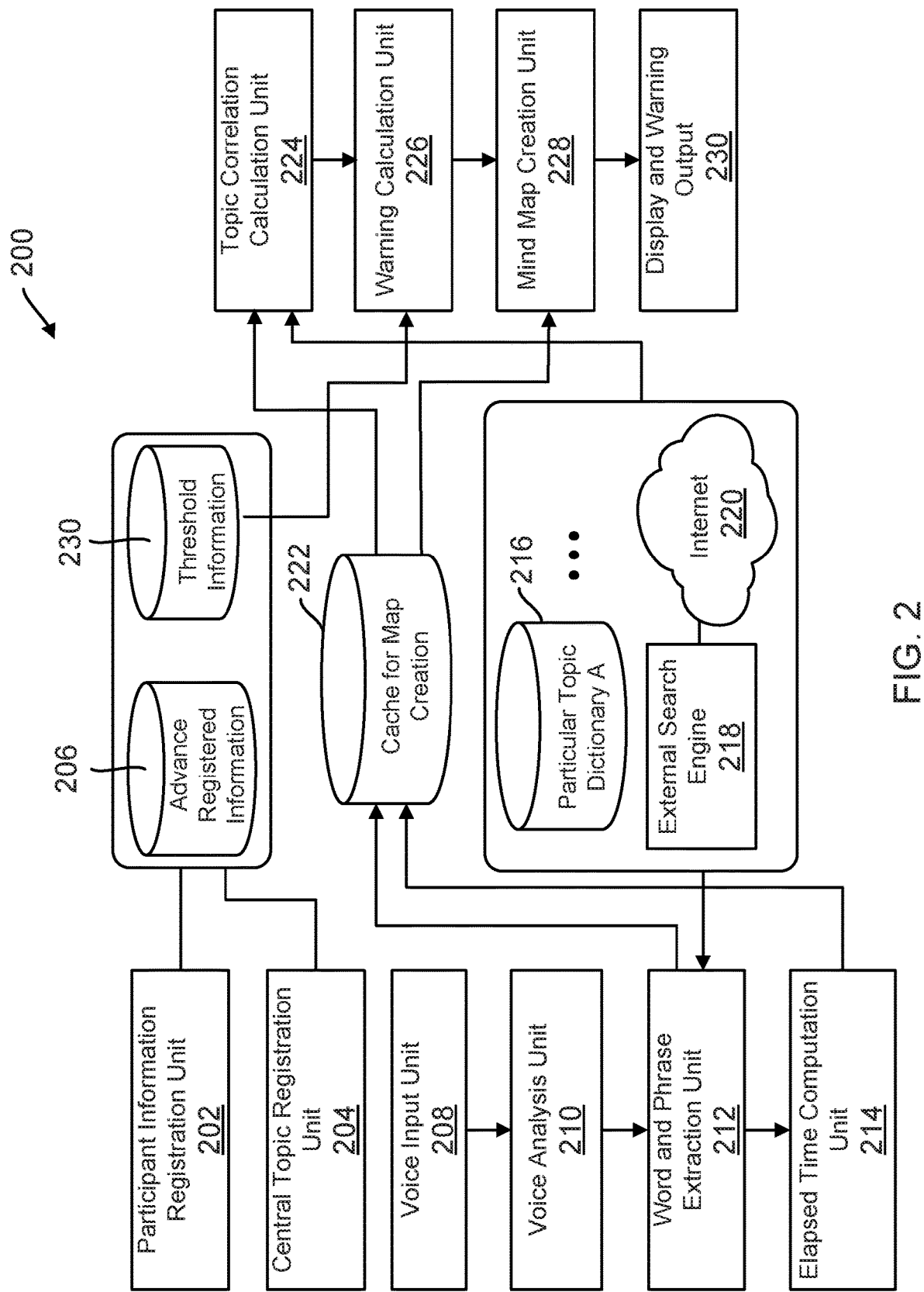
FIG. 2 illustrates a configuration of components for facilitating meetings, according to one example.

FIG. 2 illustrates a configuration 200 of components for facilitating meetings, according to one example. In one embodiment, each of the following components is implemented on the server computer 104.

Participant Information Registration Unit 202 and Center Topic Registration Unit 204 are configured to register participant information (202) and an initial value of a center topic for a meeting (204), which are then stored as advance registered information 206.

Voice Input Unit 208, Voice Analysis Unit 210, Word and Phrase Extraction Unit 212, and Elapsed Time Computation Unit 214 are configured to received voice input from the client devices 108, 110, 112 (208), in order to analyze statements made by participants during the meeting (210), by extracting words and phrases from the statements (212), that are stored into and retrieved from one or more topic dictionaries 216, wherein the words and phrases are searched using an external search engine 218 with Internet access 220, and then associated with a computed elapsed time (214), all of which is stored in a cache for map creation 222.

Topic Correlation Calculation Unit 224, Warning Calculation Unit 226, Mind Map Creation Unit 228, and Display and Warning Output 230 are configured to calculate a correlation between a center topic's main phrase and a new topic associated with extracted words and phrases (224), to calculate a warning based on the correlation as compared to a threshold (226), to create a mind map based on the correlation (228), and to display the mind map as well as the warning (230), on the client devices 108, 110, 112.

System Operation

In one embodiment, a center topic which serves as the theme of the meeting and participant information are registered and stored with the server computer 104 in advance of the meeting. At the start of the meeting, the participating client devices 108, 110, 112 connect to the server computer 104 via the network 102.

During the meeting, the server computer 104 displays a mind map of the center topic on the client devices 108, 110, 112. In addition, the server computer 104 displays a presentation package and optionally the participant information on the screens of the client devices 108, 110, 112.

The server computer 104 collects statements of the participants during the meeting via microphones of the client devices 108, 110, 112. The server computer 104 records a duration of each of the collected statements made by the participants, as well as the identity of the participant who made each of the collected statements.

The collected statements are subjected to voice analysis, including voice recognition, by the server computer 104 to extract words and phrases therefrom in a time-series manner. These extracted words and phrases are defined as one or more topics that are currently being discussed in the meeting.

The server computer 104 analyzes the extracted words and phrases to determine whether a transition has occurred between the topics, i.e., between a previous topic and a new topic. If so, the server computer 104 creates a data structure representing a relationship between the new topic and the previous topic, and the data structure is stored as a linked list in memory. The server computer 104 also identifies the new topic as the topic or topics that are currently being discussed.

The server computer 104 calculates a correlation between the topics that are currently being discussed and the center topic.

The server computer 104 determines a location of the topics that are currently being discussed on the mind map, based on a magnitude of the calculated correlation, and displays an updated mind map on the client devices 108, 110, 112. The mind map may be updated as it changes, or periodically at the expiration of a predetermined period of time.

The relationship between the new topic and previous topic is displayed on the mind map as an arrow or directed link representing an order of occurrence of the topics that are currently being discussed.

When the following conditions are satisfied, it is determined that the proceeding of the discussion has been retarded, and the server computer 104 generates a visual and/or audio warning on the client devices 108, 110, 112:

The topics that are currently being discussed have a weak correlation with the center topic and this state continued for a predetermined period of time.

The topics that are currently being discussed are repeated or recursive topics and this state continued for a predetermined period of time.

The relationship between the new topic and previous topic forms a loop and this state remains for a predetermined period of time.

As the meeting proceeds, the topics that are currently being discussed may become a center of discussion, based on the relationship between the topics that have been discussed and the elapsed times dedicated to these topics during the meeting. If this occurs, and the topics that are currently being discussed are different from the center topic that was specified in advance, then the topics that are currently being discussed may be designated as the center topic.

These and other aspects of the system for facilitating meetings are described in more detail below.

The System and its User Interface

FIG. 3A shows a typical environment for using the system for facilitating meetings, wherein one or more participating client devices 108, 110, 112 are connected to the server computer 104 implementing system. In this example, the client devices include two laptops 110 (one of which is connected to a projector) in a meeting room with multiple participants, as well as a smartphone 112 at another location used by a single participant, all of which are connected to the server computer 104. In each instance, voice information of the participants is collected by microphones of the participating client devices 108, 110, 112 and transmitted to the server computer 104.

FIG. 3B shows a graphical user interface 300 presented by the server computer 104 on each of the participating client devices 108, 110, 112. Typically, the graphical user interface 300 includes a presentation package 302 that is shared with participants, as well as the mind map 304 of the meeting. Moreover, the user interface may include video and/or audio of the meeting, as well as video and/or audio cues ("beep") 306 to identify specific events occurring in the meeting.

Each participant is allowed to confirm by "Map Info" not only the presentation package 302, but also information on the center topic and respective topics discussed. One display mode can be selected from a set of display modes by the client devices 108, 110, 112. The warning 306 is visually represented via "Map Info" or issued as warning beeps or the like.

Voice Analysis and the Extraction of Words and Phrases in a Time-Series Manner.

Figure 4B:
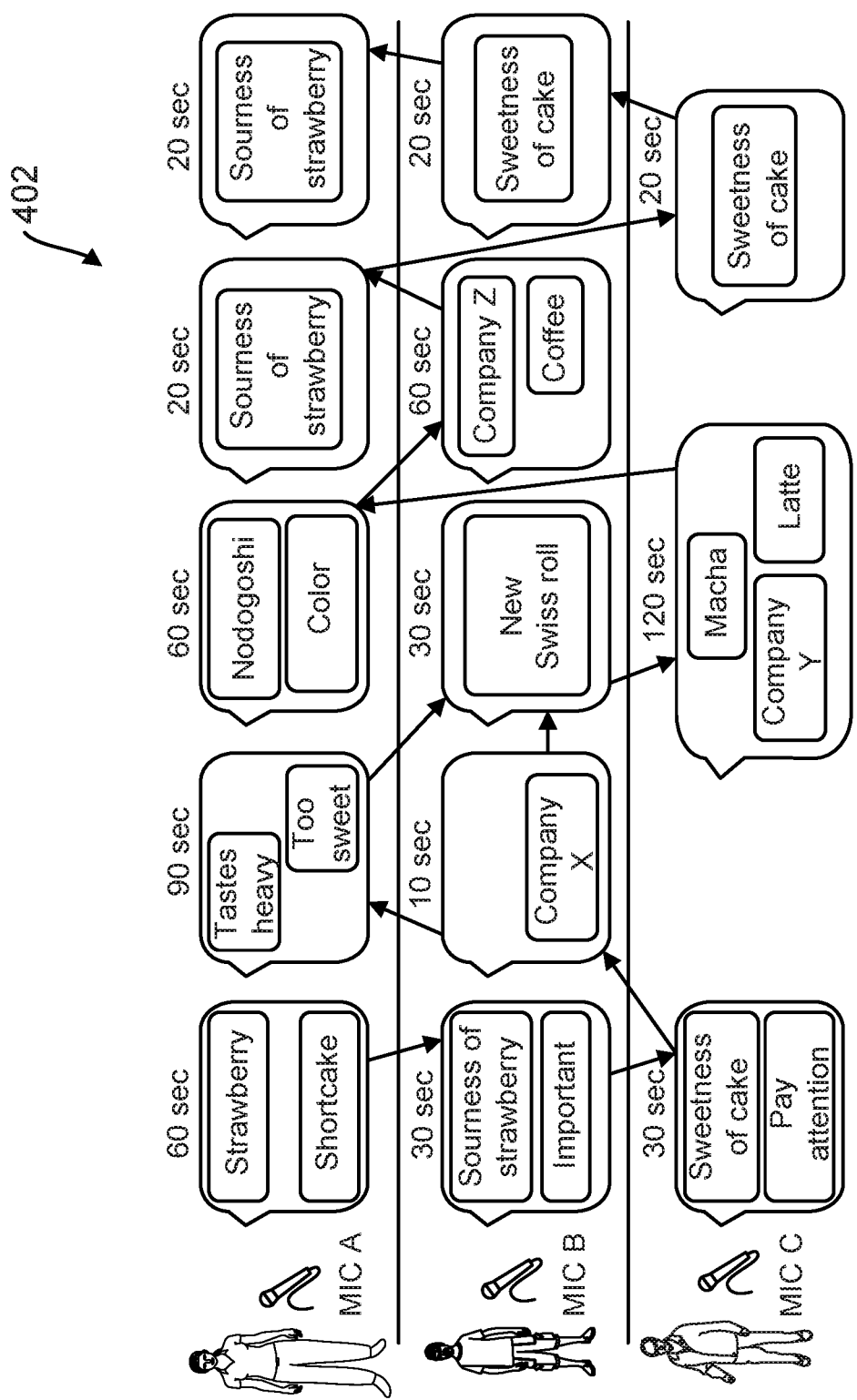
Figure 4C:
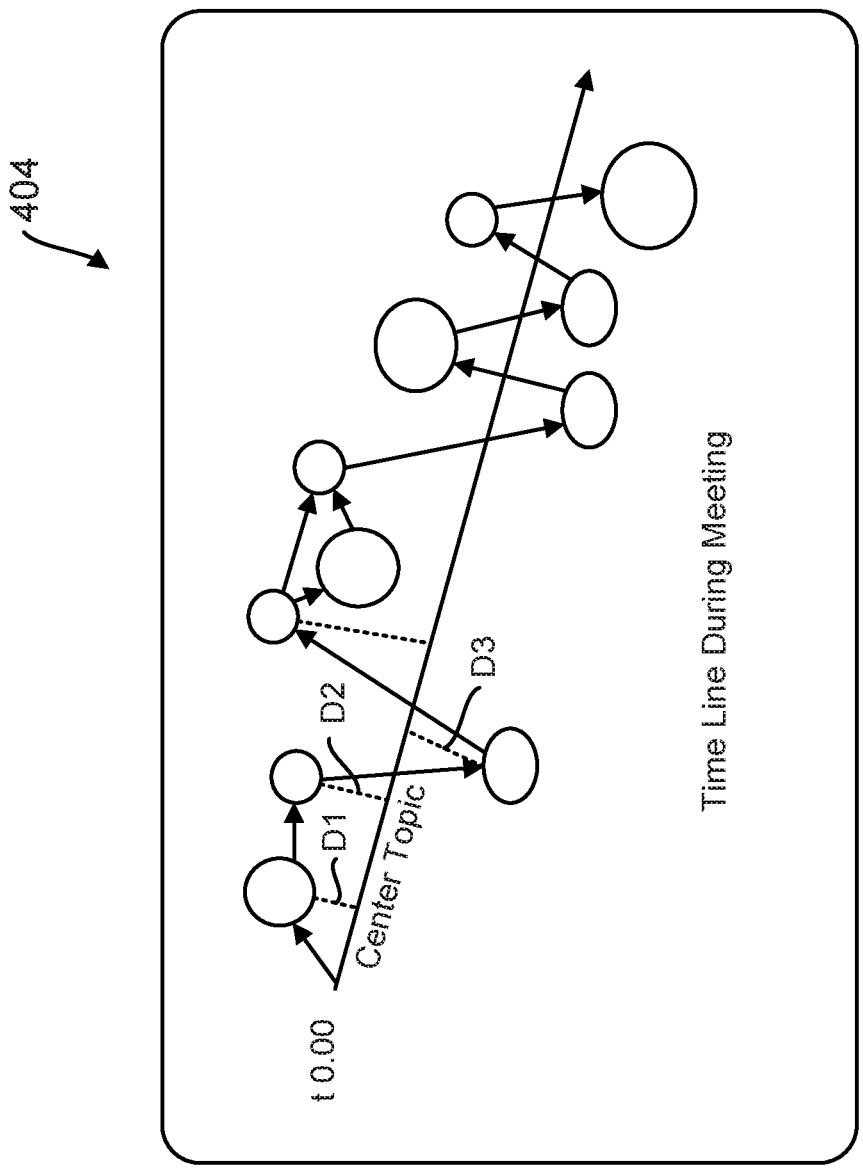

FIGS. 4A, 4B and 4C illustrate the voice analysis performed by the server computer 104, wherein words and phrases are extracted in a time-series manner.

FIG. 4A shows the text output 400 from the voice analysis of the statements made in the meeting, wherein the statements comprise:

Statements in the Meeting:
A: It's strawberry shortcake, isn't it?
B: Don't you think that sourness of strawberry is important?
C: Instead I would like to pay attention to sweetness of the cake.

The underlined words and phrases are extracted by the server computer 104 in order to define the topics that are currently being discussed during the meeting.

In addition to extracting the words and phrases from the statements made by the participants of the meeting, the server computer 104 also measures the duration of each of the statements and identifies the participant making the statement.

FIG. 4B shows the time-series 402 of the words and phrases extracted by the voice analysis, including the identity of the participant making the statement and the measured duration of each of the statements. Each participant is identified as a separate row containing their statements, with images at the beginning of the row representing the participant and the microphone (MIC A, MIC B and MIC C) associated with the participant. The words and phrases are shown as nodes (with word nodes positioned inside their associated phrase nodes) with arrows connecting between the nodes to show the sequence of the statements. (The term "Nodogoshi" is defined as sensation of liquid passing through the throat of someone as he/she drinks it.)

FIG. 4C shows a mind map 404 of the topics discussed during the meeting, as a timeline based on the time-series of the words and phrases extracted by the voice analysis, and as a distance D1, D2, D3 from the center topic, which is represented by a line with an arrow indicating the flow of the timeline. The timeline begins at time t=0.00, i.e., the start of the meeting, and flows from left to right for the duration of the meeting. The topics being discussed are shown as nodes, and their calculated correlation with the center topic are represented by their distance from the line representing the center topic. The arrows connecting between the nodes show the sequence of the topics.

Mind Map Display of the Center Topic and Topics Currently being Discussed

Figure 5:
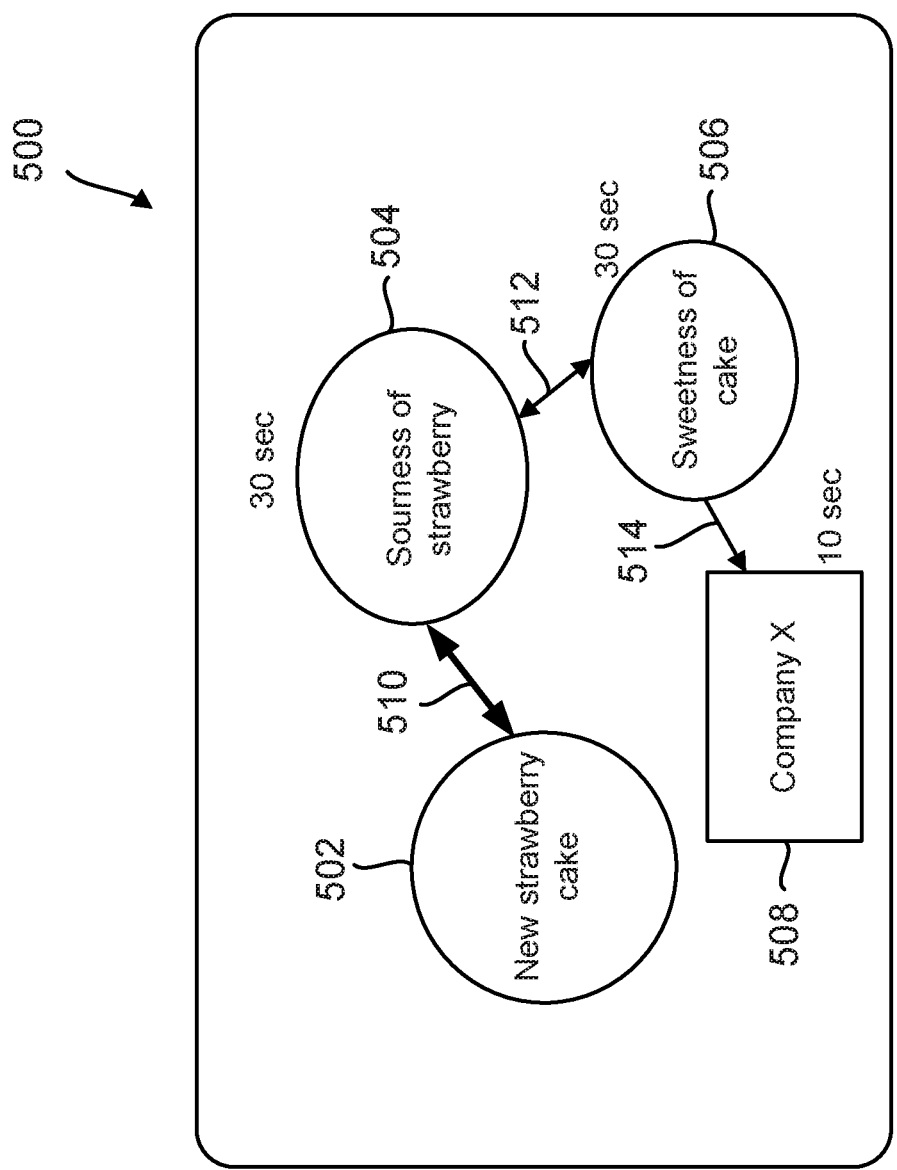
FIG. 5 shows how the server creates the mind map to indicate both the center topic and the topic currently being discussed.

FIG. 5 shows how the server computer 104 creates the mind map 500 to indicate both the center topic and the topic currently being discussed.

The center topic is first specified on the map 500, wherein the center topic is displayed as a first node 502 with a main phrase having content similar to that of the center topic. In this example, the main phrase comprises "New strawberry cake." In one embodiment, the first node 502 for the center topic is arranged at a central (vertical) position of the map 500.

When a new topic is introduced as the topic currently being discussed, another node 504, 506, 508 is created on the map 500 by the server computer 104. A main phrase is extracted from the collected statements, and the node 504, 506, 508 is displayed containing the main phrase. In this example, the main phrase comprises "Sourness of strawberry" for a second node 504, the main phrase comprises "Sweetness of cake" for a third node 506, and the main phrase comprises "Company X" for a fourth node 508, which are created in that order.

The server computer 104 creates and displays each node 502, 504, 506, 508 having a size representative of the number of times the main phrase appears in the collected statements. The server computer 104 displays each node 504, 506, 508 having a position on the map 500 based on the topic's calculated correlation with the node 502 for the center topic, wherein a node each node 504, 506, 508 having a stronger calculated correlation with the node 502 for the center topic is arranged at a position closer to the central position of the node 502 for the center topic.

Optionally, the server computer 104 displays each node 502, 504, 506, 508 with a color assigned to one or more of the participants, e.g., the color assigned to the participant who first uttered the main phrase of each node 502, 504, 506, 508, or the color assigned to the participant who utters the main phrase of each node 502, 504, 506, 508 the most times, or the mix of colors assigned to the participants who uttered the main phrase of each node 502, 504, 506, 508, or the speaker(s) who satisfies some other criteria.

The server computer 104 may or may not display each node 502, 504, 506, 508 having a link to one or more of the other nodes 502, 504, 506, 508, wherein the link is an arrow 510, 512, 514 between the nodes 502, 504, 506, 508 that represents the order of the collected statements that contain the main phrases for the nodes 502, 504, 506, 508, and the width of the arrow 510, 512, 514 is representative of the frequency of the collected statements made by one or more the participants that contain the main phrase of the linked node 502, 504, 506, 508. In this example, the arrow 510 between the nodes 502, 504 is in both directions indicating a recursive or repeated discussion of the topics associated with both of the nodes 502, 504; the arrow 512 between the nodes 504, 506 is in both directions indicating a recursive or repeated discussion of the topics associated with both of the nodes 504, 506; and the arrow 514 between the nodes 506, 508 is in one direction indicating a transition between the topic associated with the node 506 to the topic associated with the node 508. Also in this example, the arrow 510 has a width greater than the arrows 512 and 514, which are of equal width, wherein the width is representative of the frequency of the collected statements made by one or more the participants that contain the main phrase of the linked node 502, 504, 506, 508.

Finally, the server computer 104 may display the nodes 504, 506, 508 with an annotation (e.g., "30 sec", "30 sec", "10 sec") showing a duration of the collected statements made by one or more the participants that contain the main phrase of the node 504, 506, 508.

Mind Map Display and the Generation of Warnings

Figure 6:
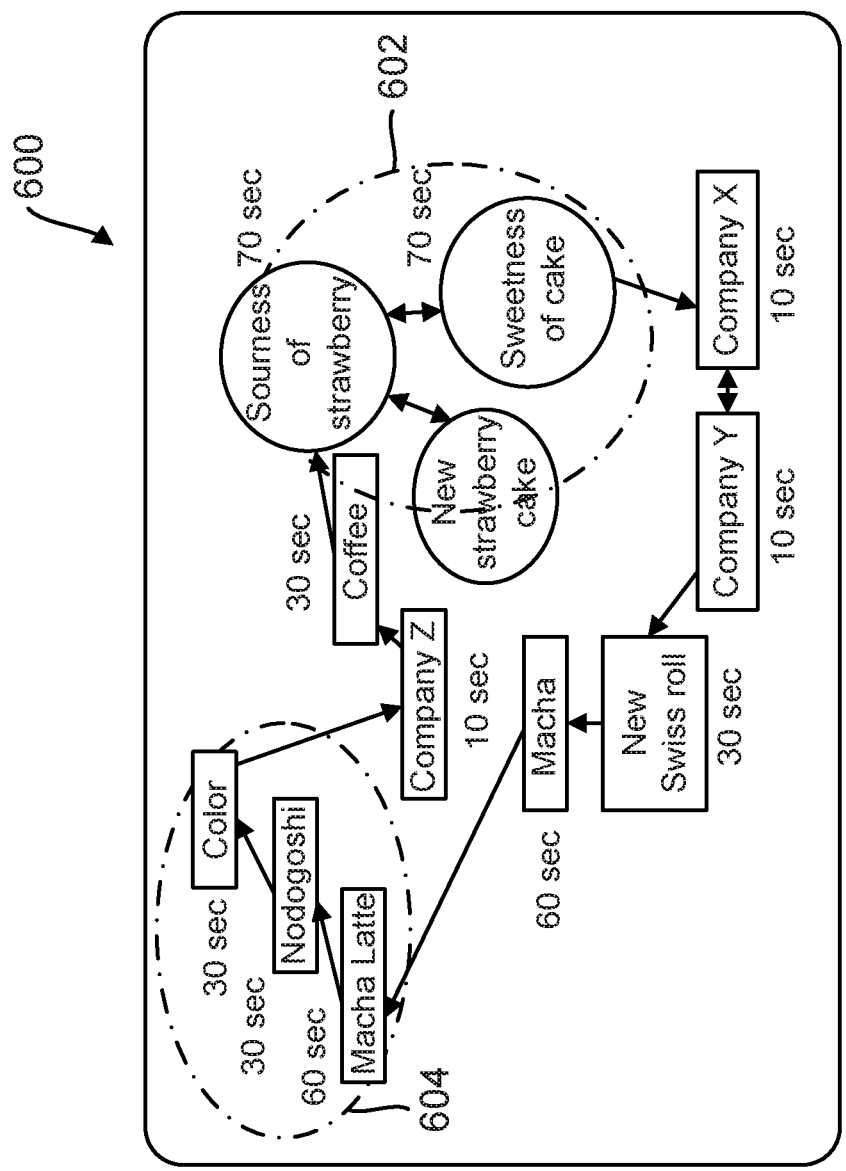
FIG. 6 shows how the server creates the mind map to generate one or more warnings.

FIG. 6 shows how the server computer 104 creates the mind map 600 to generate one or more warnings.

In this example, the server computer 104 displays the center topic on the map 600 as a first node containing the phrase "New strawberry cake."

The server computer 104 displays a new topic on the map 600 as a second node containing the phrase "Sourness of strawberry." The server computer 104 displays the second node with a color (or mix of colors) assigned to one or more of the participants. The server computer 104 displays the second node having an annotation showing a duration of the collected statements made by one or more the participants that contain the main phrase of the node. The server computer 104 displays a directed link between the first and second nodes that represents the order of the collected statements that contain the main phrases for the nodes, and the width of the link is representative of the frequency of the collected statements made by one or more of the participants that contain the main phrases of the linked nodes.

The server computer 104 displays a new topic on the map 600 as a third node containing the phrase "Sweetness of cake." The server computer 104 displays the third node with a color (or mix of colors) assigned to one or more of the participants. The server computer 104 displays the third node having an annotation showing a duration of the collected statements made by one or more the participants that contain the main phrase of the node. The server computer 104 displays a directed link between the second and third nodes that represents the order of the collected statements that contain the main phrases for the nodes, and the width of the link is representative of the frequency of the collected statements made by one or more the participants that contain the main phrases of the linked nodes.

Together, the first, second and third nodes comprise a state, indicated by the dashed lines 602, where the same words and phrases ("strawberry", "cake") are repeated. Anything outside this state 602 would comprise a warning area where digression from the center topic has occurred, resulting in the server computer 104 generating a video and/or audio warning to the participating client devices 108, 110, 112 indicating that the meeting proceedings are being retarded.

For example, the server computer 104 displays a new topic on the map 600 as a fourth node containing the phrase "Company X." The system server computer 104 the fourth node with a color (or mix of colors) assigned to one or more of the participants. The server computer 104 displays the fourth node having an annotation showing a duration of the collected statements made by one or more the participants that contain the main phrase of the node. The server computer 104 displays a directed link between the third and fourth nodes that represents the order of the collected statements that contain the main phrases for the nodes, and the width of the link is representative of the frequency of the collected statements made by one or more the participants that contain the main phrases of the linked nodes.

The server computer 104 displays a new topic on the map 600 as a fifth node containing the phrase "Company Y." The server computer 104 displays the fifth node with a color (or mix of colors) assigned to one or more of the participants. The server computer 104 displays the fifth node having an annotation showing a duration of the collected statements made by one or more the participants that contain the main phrase of the node. The server computer 104 displays a directed link between the fourth and fifth nodes that represents the order of the collected statements that contain the main phrases for the nodes, and the width of the link is representative of the frequency of the collected statements made by one or more the participants that contain the main phrases of the linked nodes.

The server computer 104 displays a new topic on the map 600 as a sixth node containing the phrase "New Swiss roll." The server computer 104 displays the sixth node with a color (or mix of colors) assigned to one or more of the participants. The system server computer 104 the sixth node having an annotation showing a duration of the collected statements made by one or more the participants that contain the main phrase of the node. The server computer 104 displays a directed link between the fifth and sixth nodes that represents the order of the collected statements that contain the main phrases for the nodes, and the width of the link is representative of the frequency of the collected statements made by one or more the participants that contain the main phrases of the linked nodes.

The server computer 104 displays a new topic on the map 600 as a seventh node containing the phrase "Macha." The server computer 104 displays the seventh node with a color (or mix of colors) assigned to one or more of the participants. The server computer 104 displays the seventh node having an annotation showing a duration of the collected statements made by one or more the participants that contain the main phrase of the node. The server computer 104 displays a directed link between the sixth and seventh nodes that represents the order of the collected statements that contain the main phrases for the nodes, and the width of the link is representative of the frequency of the collected statements made by one or more the participants that contain the main phrases of the linked nodes.

The server computer 104 displays a new topic on the map 600 as an eighth node containing the phrase "Macha Latte." The server computer 104 displays the eighth node with a color (or mix of colors) assigned to one or more of the participants. The server computer 104 displays the eighth node having an annotation showing a duration of the collected statements made by one or more the participants that contain the main phrase of the node. The server computer 104 displays a directed link between the seventh and eighth nodes that represents the order of the collected statements that contain the main phrases for the nodes, and the width of the link is representative of the frequency of the collected statements made by one or more the participants that contain the main phrases of the linked nodes.

The server computer 104 displays a new topic on the map 600 as a ninth node containing the phrase "Nodogoshi". The server computer 104 displays the ninth node with a color (or mix of colors) assigned to one or more of the participants. The server computer 104 displays the ninth node having an annotation showing a duration of the collected statements made by one or more the participants that contain the main phrase of the node. The server computer 104 displays a directed link between the eighth and ninth nodes that represents the order of the collected statements that contain the main phrases for the nodes, and the width of the link is representative of the frequency of the collected statements made by one or more the participants that contain the main phrases of the linked nodes.

The server computer 104 displays a new topic on the map 600 as a tenth node containing the phrase "Color." The server computer 104 displays the tenth node with a color (or mix of colors) assigned to one or more of the participants. The server computer 104 displays the tenth node having an annotation showing a duration of the collected statements made by one or more the participants that contain the main phrase of the node. The server computer 104 displays a directed link between the ninth and tenth nodes that represents the order of the collected statements that contain the main phrases for the nodes, and the width of the link is representative of the frequency of the collected statements made by one or more the participants that contain the main phrases of the linked nodes.

Together, the eighth, ninth and tenth nodes, based on the associated words and phrases, comprise a state, indicated by the dashed lines 604, of considerable digression from the center topic. Anything inside this state 604 would result in the server computer 104 generating a more urgent video and/or audio warning to the participating client devices 108, 110, 112 indicating that the meeting proceedings are being retarded.

Thereafter, the server computer 104 displays a new topic on the map 600 as an eleventh node containing the phrase "Company Z." The system server computer 104 the eleventh node with a color (or mix of colors) assigned to one or more of the participants. The server computer 104 displays the eleventh node having an annotation showing a duration of the collected statements made by one or more the participants that contain the main phrase of the node. The server computer 104 displays a directed link between the tenth and eleventh nodes that represents the order of the collected statements that contain the main phrases for the nodes, and the width of the link is representative of the frequency of the collected statements made by one or more the participants that contain the main phrases of the linked nodes.

The server computer 104 displays a new topic on the map 600 as a twelfth node containing the phrase "Coffee." The server computer 104 displays the twelfth node with a color (or mix of colors) assigned to one or more of the participants. The server computer 104 displays the twelfth node having an annotation showing a duration of the collected statements made by one or more the participants that contain the main phrase of the node. The server computer 104 displays a directed link between the eleventh and twelfth nodes that represents the order of the collected statements that contain the main phrases for the nodes, and the width of the link is representative of the frequency of the collected statements made by one or more the participants that contain the main phrases of the linked nodes. The server computer 104 also displays a directed link between the twelfth and second nodes that represents the order of the collected statements that contain the main phrases for the nodes, and the width of the link is representative of the frequency of the collected statements made by one or more the participants that contain the main phrases of the linked nodes.

Time-Series Display of the Center Topic and Topics Currently Being Discussed

Figure 7:
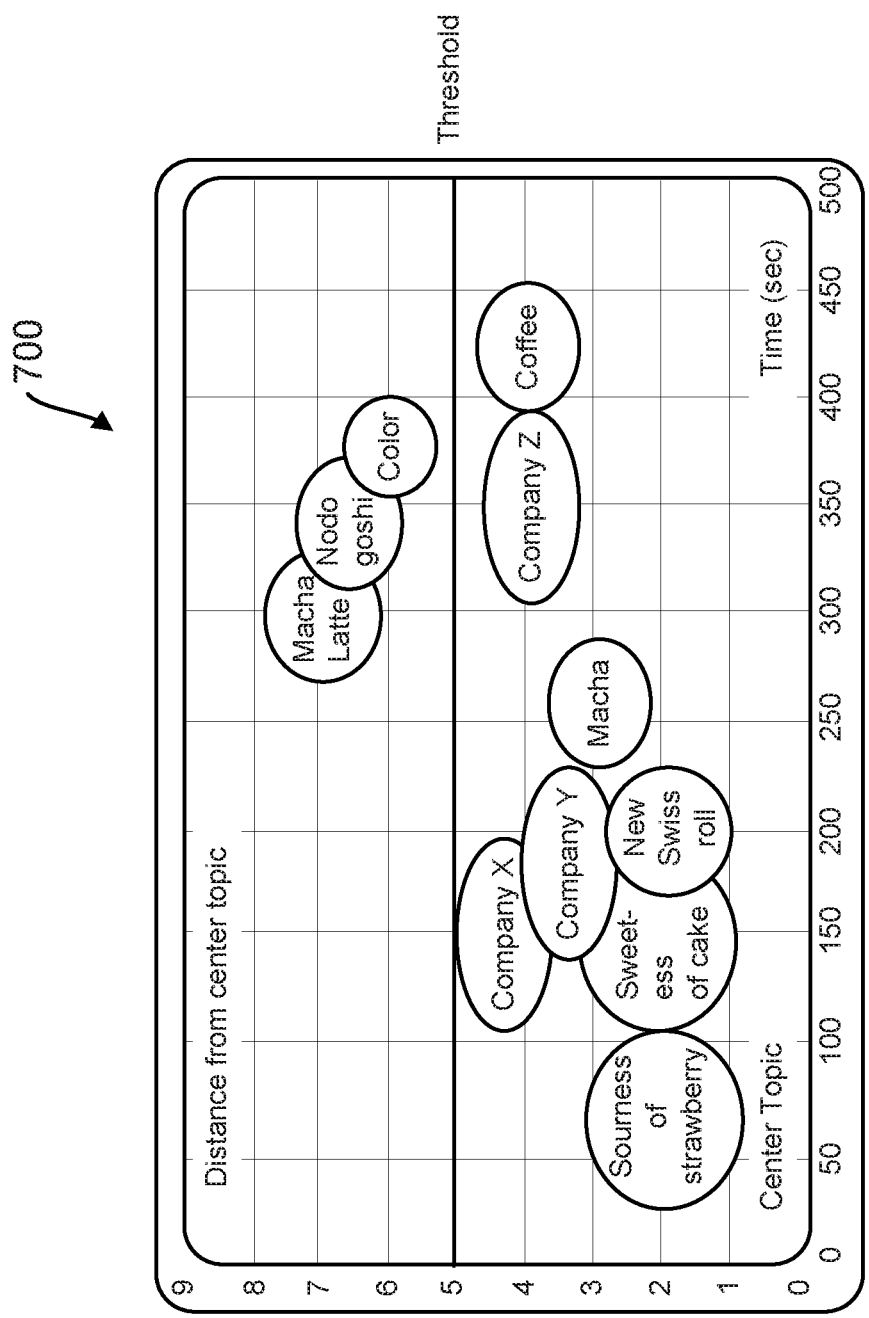
FIG. 7 shows how the server creates a time-series display to indicate both the center topic and the topic currently being discussed, as an alternative to the mind map.

FIG. 7 shows how the server computer 104 creates a mind map 700 that is a time-series display to indicate both the center topic and the topic currently being discussed, as an alternative to the mind map. Note that FIG. 7 uses the same data as shown in FIG. 6, but displays the data in a different view mode as compared to FIG. 6.

In this example, the mind map 700 displays the nodes on a graph, wherein the x-axis corresponds to time and y-axis corresponds to distance from the center topic. Note that a threshold may be specified for the distance from the center topic, e.g., a distance of 5 on the y-axis, and any nodes above that threshold, e.g., the eighth, ninth and tenth nodes in the state of considerable digression, would result in the server computer 104 generating a visual and/or audio warning to the participants.

Mind Map Display and the Computation of a New Center Topic

Figure 8:
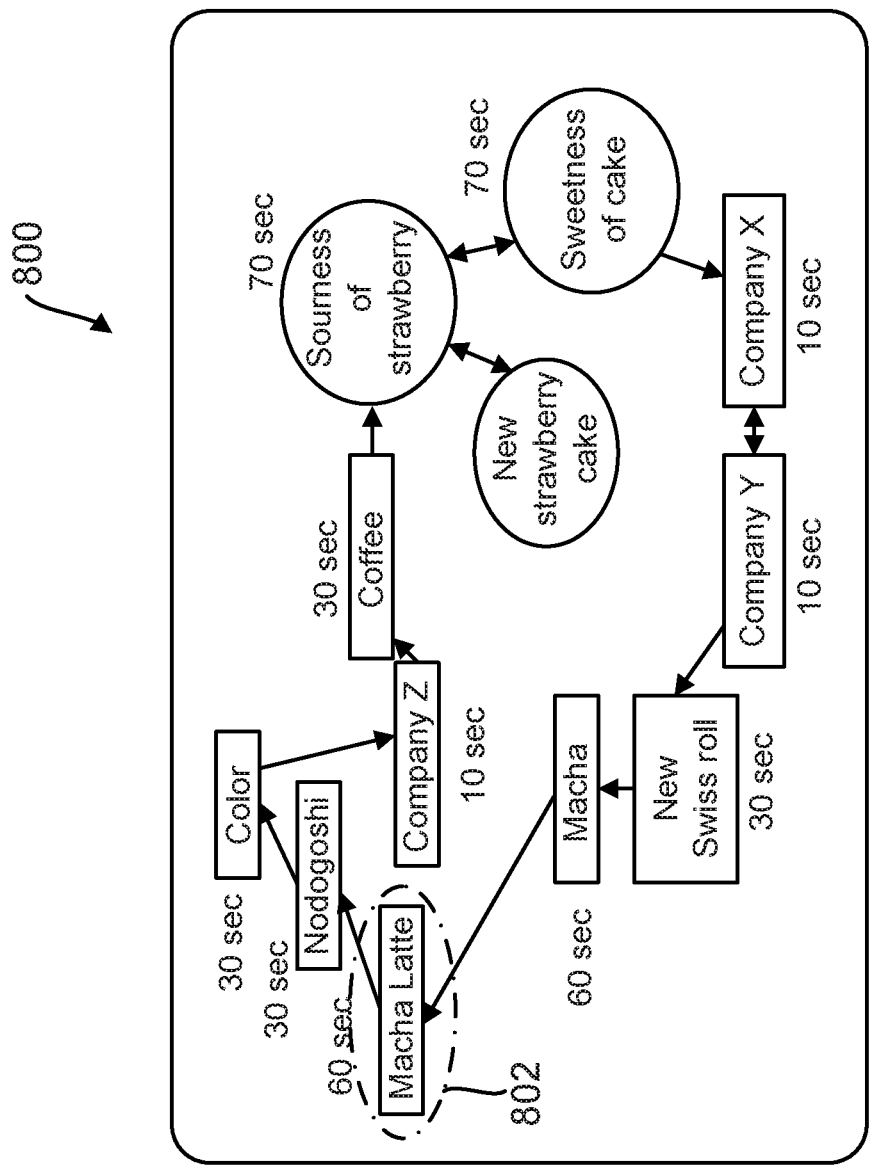
FIG. 8 shows how the server creates a mind map with a new center topic designated using the topic currently being discussed.

FIG. 8 shows how the server computer 104 creates a mind map 800 with a new center topic designated using the topic currently being discussed, using the same data as shown in FIG. 6. Specifically, FIG. 8 shows that the eighth topic, identified by the node with the main phrase "Macha Latte" and the dashed lines 802, has become the actual center topic of the meeting, which is indicated by the server computer 104 causing the display of the eighth node to be emphasized by blinking, or the changing of colors, or some other visual or audio emphasis.

Extracting Words and Phrases from Consecutive Statements and Generating a Topic

Figure 9:
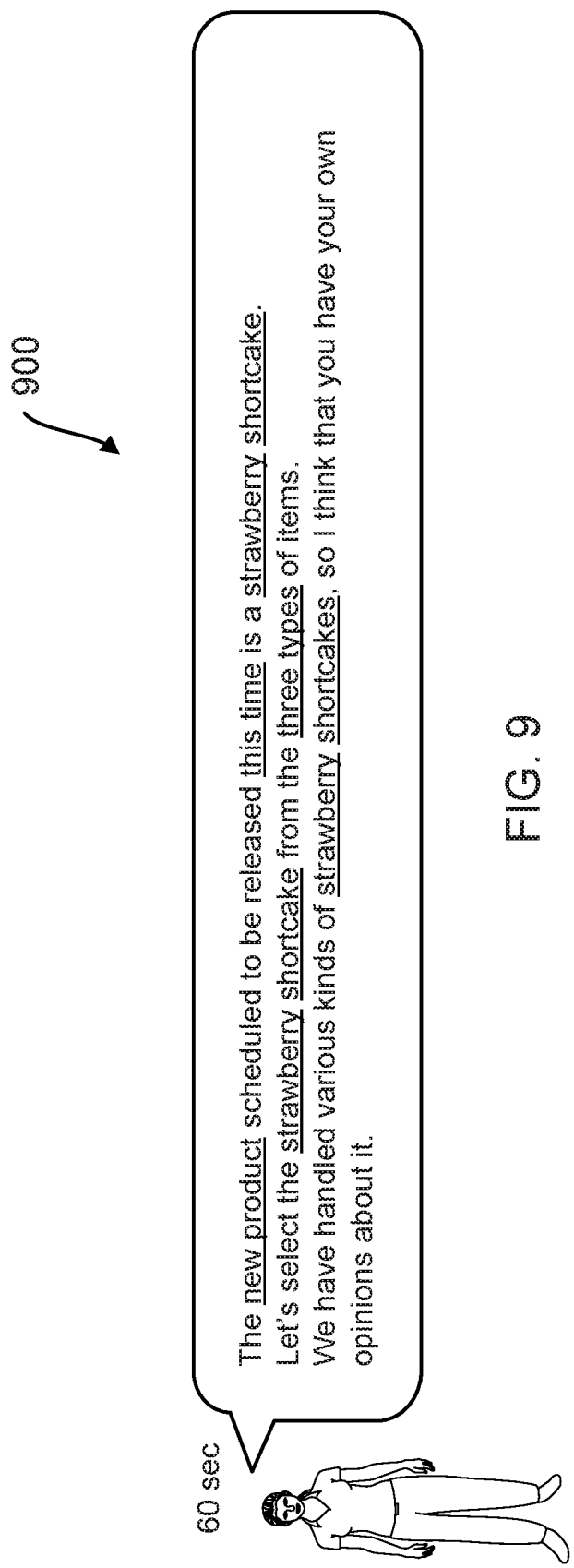
FIG. 9 illustrates how the server uses voice analysis, including voice recognition, to extract words and phrases from consecutive statements made by one or more of the participants, and then generates a topic from the extracted words and phrases.

FIG. 9 illustrates how the server computer 104 uses voice analysis, including voice recognition, to extract words and phrases from consecutive statements 900 made by one or more of the participants, and then generates a topic from the extracted words and phrases. Specifically, the server computer 104 treats the consecutive statements 900 made by one of the participants as a set of statements with a measured elapsed time.

In this example, the set of statements comprise:

"The new product scheduled to be released this time is a strawberry cake. Let's select the strawberry cake from the three types of items. We have handled various kinds of strawberry cakes, so I think that you have your own opinions about it."

and the measured elapsed time is 60 seconds. One or more words and phrases are extracted from the set of statements, which are indicated by underlines above, using generally known methodologies.

Examples of generally known methodologies include: (1) extraction of nouns by morphological analysis; and (2) extraction of keywords by natural language processing, such as term frequency-inverse document frequency (TF-IDF). Other generally known methodologies may be used as well.

Creating a Mind Map Using the Extracted Words and Phrases

In one example, the server computer 104 uses a graph description language, such as DOT, to create a mind map. DOT supports both directed and undirected graph types, wherein an undirected graph shows simple relations between objects and a directed graph shows relationships between nodes. Various attributes can be applied to graphs, nodes and edges in DOT, wherein these attributes can control aspects such as color, shape, and line styles.

The server computer 104 uses the following information to create the mind map:
  Two phrases: A, B.
  The relationship of the two phrases: A→B, or B→A.
    (Note that they are two different relationships.)
  Respective frequencies of appearance of the phrases A and B as such.
  Frequency of appearance of the A⇔B relationship.
  Elapsed time information.

The server computer 104 calculates the correlation between the two phrases, which is described below. The server computer 104 then creates a one-dimensional representation of the relationship using DOT, namely, the distance between the two phrases.

Calculation of the Correlation Between Phrases

A number of different methods may be used by the server computer 104 to calculate the correlation between phrases. In one example, this is used to calculate the correlation between the center topic's main phrase and an extracted phrase.

In one method, a bag-of-words (BOW) model is used with Google™ search to calculate the correlation between the center topic's main phrase and an extracted phrase. The bag-of-words model creates a simplified representation for natural language processing, wherein a text (such as a phrase) is represented as the bag (multiset) of its words, disregarding grammar and even word order, but keeping multiplicity, and the frequency of occurrence of each word is used as a feature.

However, term frequencies are not necessarily the best representation for the text. Common words like "the", "a", "to" are almost always the terms with highest frequency in the text. Thus, having a high raw count does not necessarily mean that the corresponding word is more important. To address this problem, one of the most popular ways to "normalize" the term frequencies is to weight a term by the inverse of document frequency (IDF).

Thereafter, the server computer 104 uses a particular topic dictionary (A, B X) or an external search engine, such as Google™ search, to calculate the correlation, wherein a larger value indicates a stronger correlation. For example, the following results may be obtained by the server computer 104 using Google™ search:
  (Strawberry cake): 803,000 items
  (Strawberry cake; Sourness): about 135,000 items
  Correlation calculation: 135,000/803,000≈0.17
  (Strawberry cake; Macha latte): about 20,600 items
  Correlation calculation: 135,000/803,000≈0.03

In another method, the distance between the words in each phrase is obtained by Word2Vec™ and/or EMD (Earth Mover Distance).

Word2Vec™ is a group of related models created by Google™ that are used to produce word embeddings. These models are shallow, two-layer neural networks that are trained to reconstruct linguistic contexts of words. Word2Vec™ takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space.

EMD is a measure of the distance between two probability distributions over a region D. More generally, the EMD is used in pattern recognition to compare generic summaries or surrogates of data records called signatures. A typical signature consists of list of pairs ((x1,m1), . . . (xn,mn)), where each xi is a certain "feature" (e.g., letter in a text, etc.), and mi is "mass" (how many times that feature occurs in the record). Alternatively, xi may be the centroid of a data cluster, and mi the number of entities in that cluster. To compare two such signatures with the EMD, one must define a distance between features. The EMD between two signatures is then the minimum cost of turning one of them into the other.

In another method, the magnitude of the correlation between two phrases can be calculated using the method described in the publication Matt J. Kusner, Yu Sun, Nicholas I. Kolkin, Kilian Q. Weinberger, "From Word Embeddings To Document Distances," Proceedings of the 32nd International Conference on Machine Learning, Lille, France, 2015. JMLR: W&CP volume 37. 2015, which is incorporated by reference herein.

Figure 10:
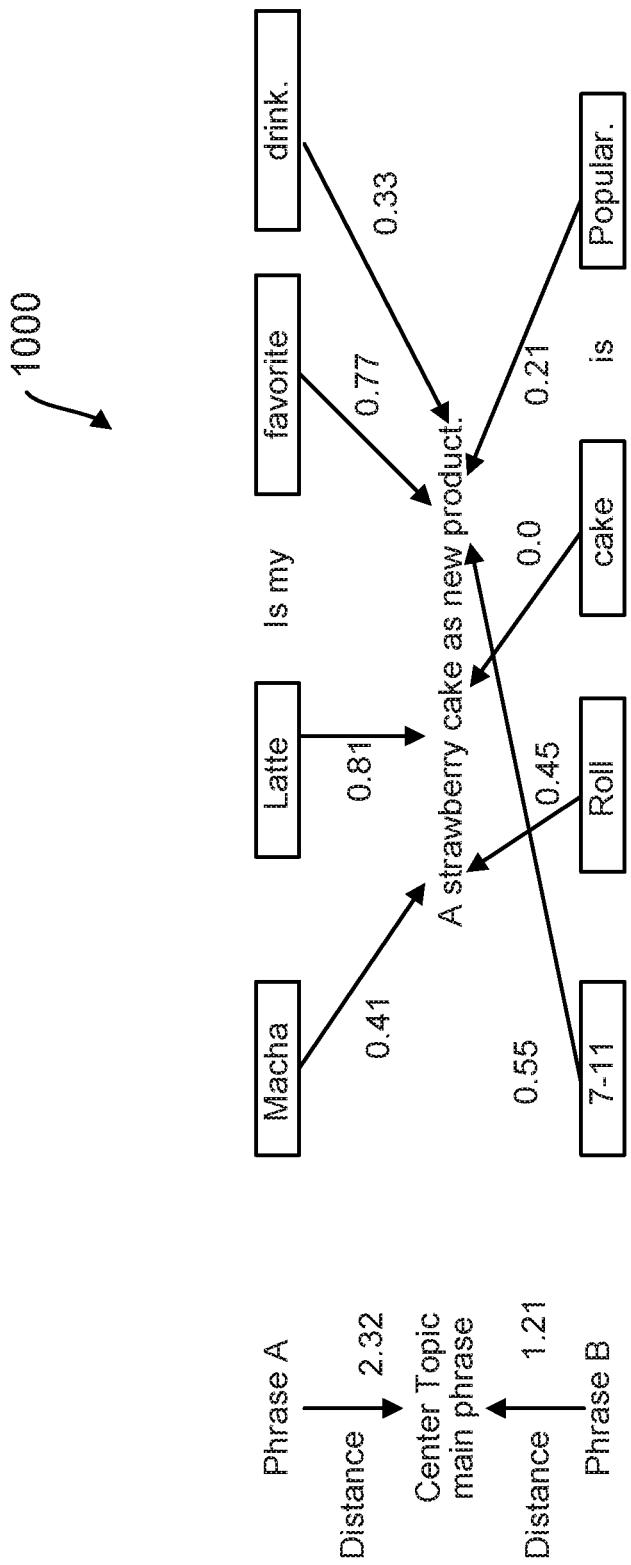
FIG. 10 visually depicts the calculations of the correlation between the center topic's main phrase and two phrases labeled as Phrase A and Phrase B.

FIG. 10 visually depicts the calculations 1000 performed by the server computer 104 of the correlation between the center topic's main phrase ("A strawberry cake as new product") and two phrases labeled as Phrase A ("Macha Latte is my favorite drink") and Phrase B ("7-11 Roll cake is Popular"), wherein the calculations 1000 are performed using any of the methods described above. The correlation between the center topic's main phrase and each Phrase A, B is calculated using the distances between the individual words of the Phrase A, B, and then summing the distances between the individual words to obtain the distance between the Phrase A, B and the center topic's main phrase. In this example, Phrase A has a distance of 2.32 from the center topic's main phrase, and Phrase B has a distance of 1.21 from the center topic's main phrase.

Computing the Center Topic from the Previous Topics

The server computer 104 also computes the center topic from the previous topics in the discussion using the following formula:

$$Rel(w_i) = \alpha(w_i) \sum_{j \in tp(mtg)} \left(\frac{tf_{ij}}{N_i}\right)$$

wherein:
  $w_i$: a certain topic (i),
  $\alpha(w_i)$: proportion of elapsed time consumed by the certain topic (i) to the time elapsed of the entire meeting,
  tp(mtg): a set of topics for which statements continued for a predetermined period of time (e.g., 60 seconds) or longer,
  $N_i$: frequency of appearance of the certain topic (i),
  $tf_{ij}$: frequency of appearance of the certain topic (i) and another topic (j), and
  $Rel(w_i)$: a relative weight of the topic, with the largest value being designated as the center topic.

In one example, the server computer 104 generates a set of topics tp(mtg) for which statements continued for a predetermined period of time (e.g., 60 seconds) or longer. In this example, the set of topics tp(mtg) comprises {"strawberry cake," "sourness," "sweetness," "macha," "macha latte"}.

The server computer 104 computes the frequency of appearance $N_i$ of a certain topic (i). In this example, the server computer 104 performs a Google™ search using set of topics tp(mtg) and the number of items found is recorded. In this example, the number of items found comprises {"strawberry cake": 709,000, "sourness": 20,100,000, "sweetness": 27,300,000, "macha": 52,200,000, "macha latte": 930,000}.

The server computer 104 computes the frequency of appearance $tf_{ij}$ of the certain topic (i) and another topic (j). In this example, the server computer 104 performs a Google™ search using a combination of elements taken from the topics set tp(mtg). In this example, the combination of elements taken from the topics set tp(mtg) comprises phrases such as "strawberry cake sourness," "strawberry cake sweetness," or the like, and the number of items found comprises ("strawberry cake sourness": 131,000+"strawberry cake sweetness": 122,000+"strawberry cake macha": 286,000+"strawberry cake macha latte": 19,300)/"strawberry cake": 709,000=0.79

The server computer 104 multiplies the above value by $\alpha(w_i)$, which has elapsed time as a parameter. In this example, if the period of time in which the topic of the "strawberry cake" was discussed is 8 minutes and the time elapsed of the entire meeting is 30 minutes, then 8/30=0.27 will result and thus the value that indicates the correlation is 0.27×0.79=0.21.

The server computer 104 performs the above computation for all the elements belonging to the topics set tp(mtg).

The server computer 104 then compares the values of the individual elements with each other, and then computes and determines the center topic in the previous discussions as the topic having the largest value.

Flowchart: Voice Analysis and Phrase Relation Information Computation

Figure 11:
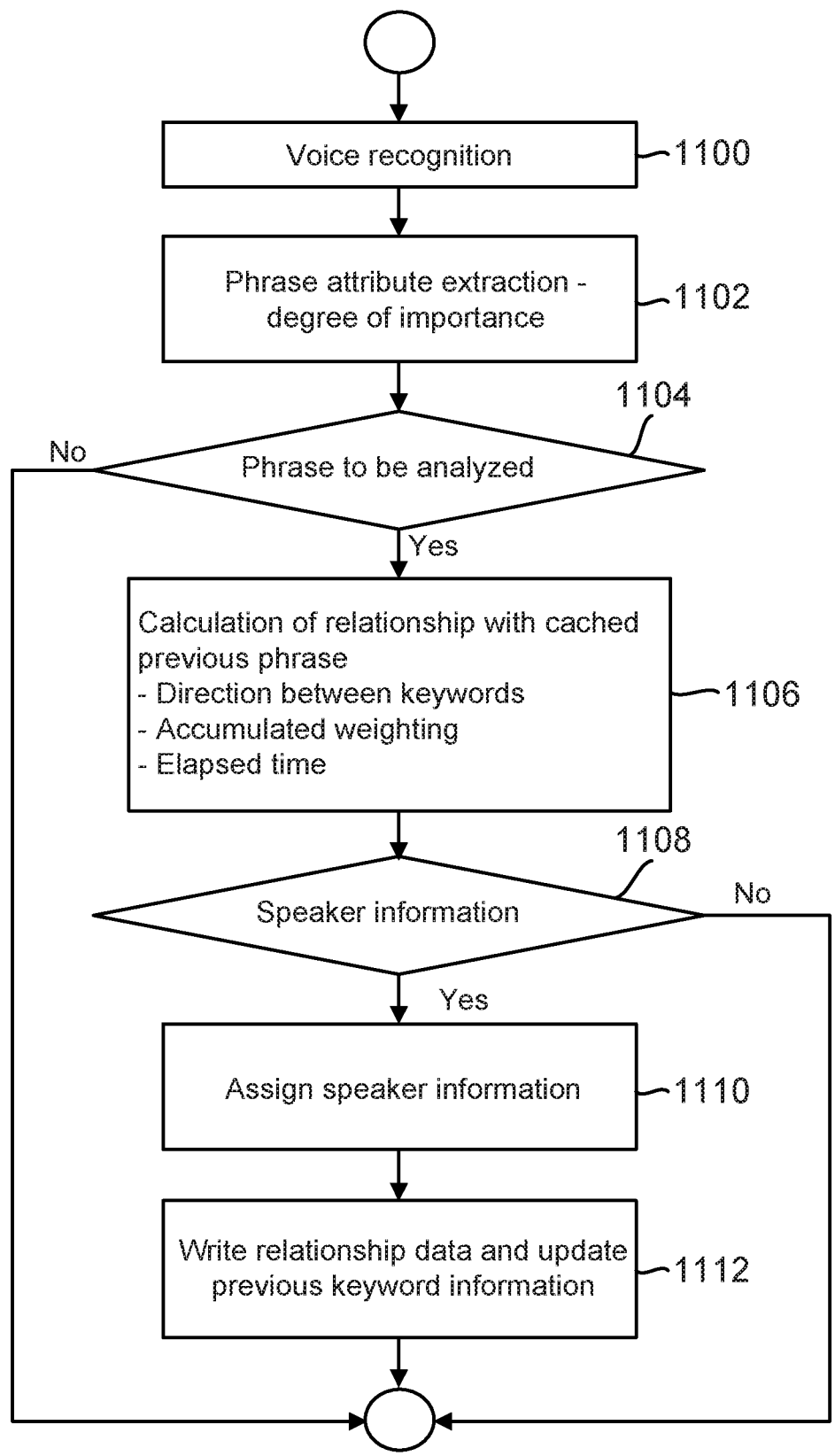
FIG. 11 is a flowchart of the voice analysis and phrase relation information computation.

FIG. 11 is a flowchart of the voice analysis and phrase relation information computation.

Block 1100 represents the server computer 104 receiving voice input from the client devices 108, 110, 112 and performing voice analysis (i.e., speech-to-text) on the voice input.

Block 1102 represents the server computer 104 performing word and phrase attribute extraction, based on the degree of importance.

Block 1104 is a decision block the represents the server computer 104 determining whether the extracted word or phrase is to be analyzed. If so, control transfers to Block 1106; otherwise, the logic terminates.

Block 1106 represents the server computer 104 calculating the relationship of the extracted word or phrase with a cached previous word or phrase. In this step, the server computer 104 also calculates a direction between the words or phrases, an accumulated weighting, and an elapsed time.

Block 1108 is a decision block the represents the server computer 104 determining whether speaker information is included. If so, control transfers to Block 1110; otherwise, control transfers to Block 1112.

Block 1110 represents the server computer 104 assigning the speaker information, i.e., identifying the participant associated with the statements.

Block 1112 represents the server computer 104 storing the relationship data and updating the previous phrases and words information.

Thereafter, the logic terminates.

Flowchart: Generation of Phrase and Map Information

Figure 12:
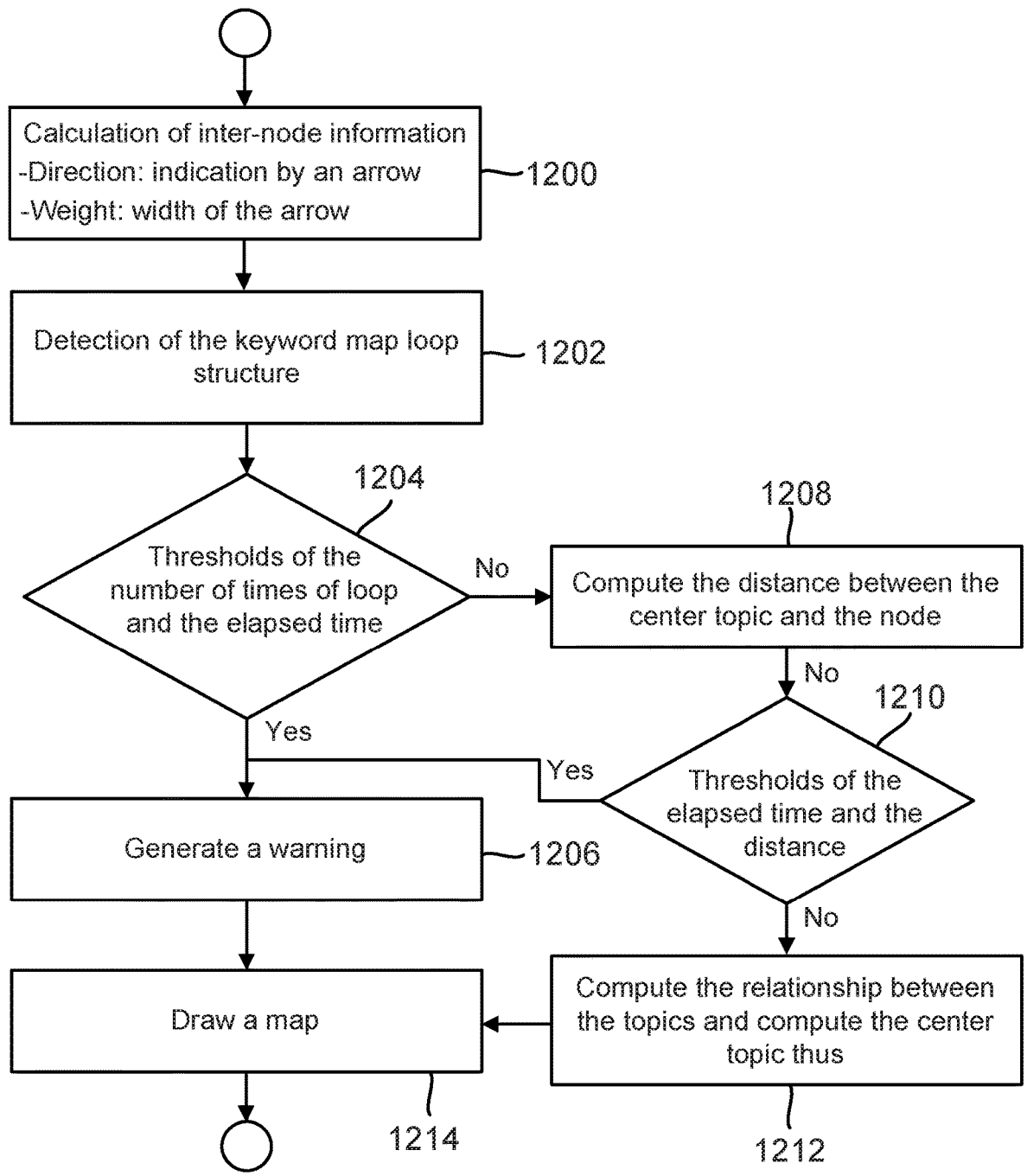
FIG. 12 is a flowchart illustrating the generation of phrase and map information.

FIG. 12 is a flowchart illustrating the generation of phrase and map information.

Block 1200 represents the server computer 104 calculating inter-node information, namely, the direction, which is indicated by an arrow, and the weight, which is the width of the arrow.

Block 1202 represents the server computer 104 performing a detection of the keyword map loop structure.

Block 1204 is a decision block the represents the server computer 104 determining the thresholds of the number of times of loop and the elapsed time. If so, control transfers to Block 1206; otherwise, control transfers to Block 1208.

Block 1206 represents the server computer 104 generating a visual and/or audio warning.

Block 1208 represents the server computer 104 computing the distance between the center topic and the node.

Block 1210 is a decision block the represents the server computer 104 determining the thresholds of the elapsed time and the distance. If so, control transfers to Block 1206 to generate a warning; otherwise, control transfers to Block 1212.

Block 1212 represents the server computer 104 computing the relationship between the topics and computing the center topic, which may be different from the previous center topic.

Thereafter, Block 1214 represents the server computer 104 drawing a map for display.

Computer System

Figure 13:
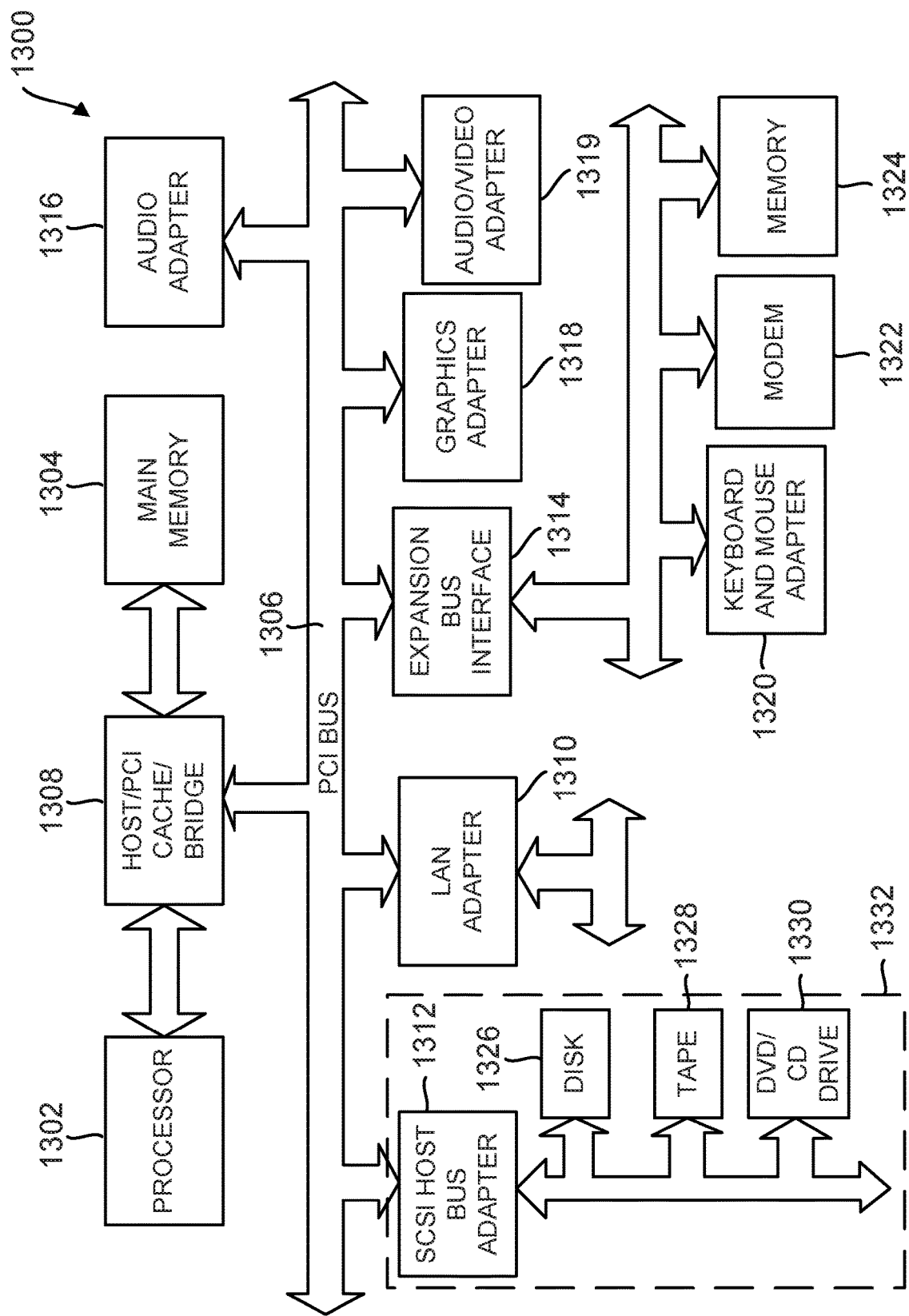
FIG. 13 is a block diagram illustrating a data processing system is depicted in which aspects of an embodiment of the invention may be implemented.

With reference now to FIG. 13, a block diagram illustrating a computer system 1300 is depicted in which aspects of an embodiment of the invention may be implemented. Computer system 1300 may comprise a server computer 104 and/or client devices 108, 110, 112.

In one example, computer system 1300 employs a peripheral component interconnect (PCI) local bus architecture, although other bus architectures may be used. Processor 1302 and main memory 1304 are connected to PCI local bus 1306 through PCI bridge 1308, which also may include an integrated memory controller and cache memory for processor 1302. Additional connections to PCI local bus 1306 may be made through direct component interconnection or through add-in boards. In the depicted example, local area network (LAN) adapter 1310, small computer system interface (SCSI) host bus adapter 1312, and expansion bus interface 1314 are connected to PCI local bus 1306 by direct component connection. In contrast, audio adapter 1316, graphics adapter 1318, and audio/video adapter 1319 are connected to PCI local bus 1306 by add-in boards inserted into expansion slots.

Expansion bus interface 1314 provides a connection for a keyboard and mouse adapter 1320, modem 1322, and additional memory 1324. SCSI host bus adapter 1312 provides a connection for hard disk drive 1326, tape drive 1328, and CD-ROM drive 1330. Typical PCI local bus implementations will support three or four PCI expansion slots or add-in connectors.

An operating system runs on processor 1302 and is used to coordinate and provide control of various components within data processing system 1300 in FIG. 13. The operating system may be a commercially available operating system. An application programming interface (API) may run in conjunction with the operating system and provide calls to the operating system from programs executing on data processing system 1300. Instructions for the operating system, the API, and the programs are located on storage devices, such as hard disk drive 1326, and may be loaded into main memory 1304 for execution by processor 1302.

Those of ordinary skill in the art will appreciate that the hardware in FIG. 13 may vary depending on the implementation. Other hardware or software may be used in addition to or in place of the hardware and software depicted in FIG. 13.

The depicted examples described herein are not meant to be limiting in any way. For example, data processing system 1300 may be a standalone or rack-mounted server; a desktop, laptop or notebook computer; or a smartphone or other portable device. Further, the present invention may reside on any data storage medium (i.e., floppy disk, compact disk, hard disk, tape, ROM, RAM, etc.) used by a computer system.

Those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented system, comprising:
a server computer implementing a system for facilitating a meeting and for providing a graphical user interface to one or more client devices connected thereto, wherein:
the server computer displays a mind map of a center topic on the client devices, the center topic serving as a theme of the meeting, and being registered with the server computer in advance of the meeting;
the server computer collects statements of participants during the meeting as voice input via microphones of the client devices, the collected statements being subjected to voice analysis, including voice recognition, by the server computer to extract words and phrases therefrom in a time-series manner, and the extracted words and phrases being defined as one or more topics that are currently being discussed in the meeting;
the server computer analyzes the extracted words and phrases to determine whether a transition has occurred between the topics, and then calculates a correlation between the topics that are currently being discussed and the center topic;
the server computer determines a location of the topics that are currently being discussed on the mind map, based on the calculated correlation, and displays an updated mind map on the client devices; and
the server computer generates a warning on the client devices when the server computer determines that the meeting proceedings are being retarded, based on the calculated correlation.

2. The system of claim 1, wherein the server computer generates the warning on the client devices when the server computer determines that the calculated correlation exceeds a threshold.

3. The system of claim 1, wherein the server computer generates the warning on the client devices when the server computer determines that the topics that are currently being discussed are repeated or recursive topics.

4. The system of claim 1, wherein the transition is displayed on the mind map as an arrow representing an order of occurrence of the topics that are currently being discussed.

5. The system of claim 1, wherein the server computer designates one of the topics that are currently being discussed as the center topic.

6. The system of claim 1, wherein the server computer records a duration of each of the collected statements made by the participants, as well as an identity of the participant who made the collected statements.

7. A computer-implemented method, comprising:
implementing a system for facilitating a meeting on a server computer and providing a graphical user interface to one or more client devices connected thereto, wherein:
the server computer displays a mind map of a center topic on the client devices, the center topic serving as a theme of the meeting, and being registered with the server computer in advance of the meeting;
the server computer collects statements of participants during the meeting as voice input via microphones of the client devices, the collected statements being subjected to voice analysis, including voice recognition, by the server computer to extract words and phrases therefrom in a time-series manner, and the extracted words and phrases being defined as one or more topics that are currently being discussed in the meeting;
the server computer analyzes the extracted words and phrases to determine whether a transition has occurred between the topics, and then calculates a correlation between the topics that are currently being discussed and the center topic;
the server computer determines a location of the topics that are currently being discussed on the mind map, based on a magnitude of the calculated correlation, and displays an updated mind map on the client devices; and
the server computer generates a warning on the client devices when the server computer determines that the meeting proceedings are being retarded, based on the calculated correlation.

8. The method of claim 7, wherein the server computer generates the warning on the client devices when the server computer determines that the calculated correlation exceeds a threshold.

9. The method of claim 7, wherein the server computer generates the warning on the client devices when the server computer determines that the topics that are currently being discussed are repeated or recursive topics.

10. The method of claim 7, wherein the transition is displayed on the mind map as an arrow representing an order of occurrence of the topics that are currently being discussed.

11. The method of claim 7, wherein the server computer designates one of the topics that are currently being discussed as the center topic.

12. The method of claim 7, wherein the server computer records a duration of each of the collected statements made by the participants, as well as an identity of the participant who made the collected statements.

13. A computer program product, the computer program product comprising a non-transitory computer readable storage medium having program instructions embodied therewith, the program instructions executable by a processor to cause the processor to:
   implement a system for facilitating a meeting on a server computer and provide a graphical user interface to one or more client devices connected thereto, wherein:
   the server computer displays a mind map of a center topic on the client devices, the center topic serving as a theme of the meeting, and being registered with the server computer in advance of the meeting;
   the server computer collects statements of participants during the meeting as voice input via microphones of the client devices, the collected statements being subjected to voice analysis, including voice recognition, by the server computer to extract words and phrases therefrom in a time-series manner, and the extracted words and phrases being defined as one or more topics that are currently being discussed in the meeting;
   the server computer analyzes the extracted words and phrases to determine whether a transition has occurred between the topics, and then calculates a correlation between the topics that are currently being discussed and the center topic;
   the server computer determines a location of the topics that are currently being discussed on the mind map, based on the calculated correlation, and displays an updated mind map on the client devices; and
   the server computer generates a warning on the client devices when the server computer determines that the meeting proceedings are being retarded, based on the calculated correlation.

14. The computer program product of claim 13, wherein the server computer generates the warning on the client devices when the server computer determines that the calculated correlation exceeds a threshold.

15. The computer program product of claim 13, wherein the server computer generates the warning on the client devices when the server computer determines that the topics that are currently being discussed are repeated or recursive topics.

16. The computer program product of claim 13, wherein the transition is displayed on the mind map as an arrow representing an order of occurrence of the topics that are currently being discussed.

17. The computer program product of claim 13, wherein the server computer designates one of the topics that are currently being discussed as the center topic.

18. The computer program product of claim 13, wherein the server computer records a duration of each of the collected statements made by the participants, as well as an identity of the participant who made the collected statements.

* * * * *